(12) United States Patent
Raffy

(10) Patent No.: US 8,586,494 B2
(45) Date of Patent: Nov. 19, 2013

(54) MELTED OXIDE GRAINS INCLUDING AL, TI, MG, AND ZR, AND CERAMIC MATERIALS COMPRISING SUCH GRAINS

(75) Inventor: Stephane Raffy, Cavaillon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 147 days.

(21) Appl. No.: 13/002,455

(22) PCT Filed: Jul. 2, 2009

(86) PCT No.: PCT/FR2009/051295
§ 371 (c)(1),
(2), (4) Date: Jan. 3, 2011

(87) PCT Pub. No.: WO2010/001065
PCT Pub. Date: Jan. 7, 2010

(65) Prior Publication Data
US 2011/0105318 A1    May 5, 2011

(30) Foreign Application Priority Data
Jul. 4, 2008    (FR) ....................................... 08 54582

(51) Int. Cl.
*C04B 35/00*    (2006.01)

(52) U.S. Cl.
USPC ............................. 501/136; 501/135; 501/127

(58) Field of Classification Search
USPC ................................... 501/134, 135, 136, 127
See application file for complete search history.

(56) References Cited

U.S. PATENT DOCUMENTS

| 7,001,861 B2 * | 2/2006 | Beall et al. ..................... 501/128 |
| 7,405,173 B2 * | 7/2008 | Marlin et al. .................. 501/105 |
| 2007/0197369 A1 | 8/2007 | Marlin et al. |

OTHER PUBLICATIONS

Wohlfromm et al. Effect of ZrSiO4 and MgO additions on reaction sintering and properties of Al2TiO5-based materials. Journal of Materials Science 25 (1990) p. 3753-3764.*
Hoffmann et al. Melt synthesis of Al2TiO5 containing composites and reinvestigation of the pahse diagram Al2O3—TiO2 by powder X-ray diffraction. J Electroceram (2006) p. 327-330.*
U.S. Appl. No. 13/386,755, filed Jan. 24, 2012, Raffy.
U.S. Appl. No. 13/379,910, filed Dec. 21, 2011, Raffy.
Wohlfromm, H. et al., "Effect of $ZrSiO_4$ and MgO Additions on Reaction Sintering and Properties of $Al_2$ $TiO_5$-Based Materials" Journal of Materials Science, vol. 25, No. 8, pp. 3753-3764, XP-002512515, (Aug. 1, 1990).
Hoffmann, S. et al., "Melt Synthesis of $Al_2TiO_5$ Containing Composites and Reinvestigation of the Phase Diagram $Al_2O_3$—$TiO_2$ by Powder X-Ray Diffraction", Journal of Electroceramics, vol. 16, No. 4, pp. 327-330, XP-002513010, (Jul. 2006).
Ishitsuka, M. et al., "Synthesis and Thermal Stability of Aluminum Titanate Solid Solutions" Journal of the American Ceramic Society, vol. 70, No. 2, pp. 69-71, XP-002512516, (Jan. 1, 1987).
International Search Report Issued Jan. 26, 2010 in PCT/FR09/051295 filed Jul. 2, 2009.

\* cited by examiner

*Primary Examiner* — Noah Wiese
(74) *Attorney, Agent, or Firm* — Oblon, Spivak, McClelland, Maier & Neustadt, L.L.P.

(57) ABSTRACT

The invention relates to a mixture of fused grains having the following chemical composition, in weight percentages on the basis of the oxides: less than 55% of $Al_2O_3$; more than 35% and less than 80% of $TiO_2$; more than 1% and less than 20% of MgO; more than 0.7% and less than 20% of $ZrO_2$; and less than 20% of $SiO_2$, said fused grains also corresponding to the following composition, in molar percentages, on the basis of the single oxides $Al_2O_3$, $TiO_2$, MgO, $ZrO_2$: 90<2a+3m<110, 100+a<3t<210−a with a+t+m+zr=100, in which: a is the molar percentage of $Al_2O_3$; t is the molar percentage of $TiO_2$; m is the molar percentage of MgO; and zr is the molar percentage of $ZrO_2$.
The invention also relates to a ceramic product obtained from such fused grains.

17 Claims, No Drawings

MELTED OXIDE GRAINS INCLUDING AL, TI, MG, AND ZR, AND CERAMIC MATERIALS COMPRISING SUCH GRAINS

The invention relates to grains for ceramic applications that are predominantly composed of oxides of the Mg, Al, Ti and Zr cations. The invention also relates to a process for manufacturing such grains, and also to ceramic products formed from said grains or comprising the latter, in particular but not uniquely, to filter structures or catalyst supports, in particular that are used in an exhaust line of a diesel-type internal combustion engine.

In the remainder of the description, the application of the grains according to the invention and their advantages in the specific field of filters or catalyst supports enabling the removal of pollutants contained in the exhaust gases originating from a petrol or diesel engine are described. It is however obvious that such grains, via the advantages that they provide, are capable of being used advantageously in numerous other applications in the field of ceramics, especially in any field for which a good thermal stability and/or a low thermal expansion coefficient (TEC) are desired. Mention may be made, in particular, but without being limited thereto, of the following fields: manufacture of refractory parts used in contact with aluminum or molten metals, slide-gate valve plates, metal filters or manufacture of saggar products for sintering furnaces.

In the particular case of exhaust gas pollution control structures, these generally have a honeycomb structure.

In a known manner, during its use, a particulate filter is subjected to a succession of filtration (soot accumulation) and regeneration (soot elimination) phases. During the filtration phases, the soot particles emitted by the engine are retained and deposited inside the filter. During the regeneration phases, the soot particles are burnt off inside the filter, in order to restore its filtering properties. It is understood therefore that the properties of mechanical strength, both at low and at high temperature, of the material that forms the filter are of prime importance for such an application. Similarly, the material must have a sufficiently stable structure in order to withstand, especially throughout the service life of the equipped vehicle, temperatures which may rise locally up to values substantially greater than 1000° C., especially if certain regeneration phases are poorly controlled.

Currently, the filters are mainly made from a porous ceramic material, usually from silicon carbide or from cordierite. Such silicon carbide catalyst filters are, for example, described in patent applications EP 816 065, EP 1 142 619, EP 1 455 923 or WO 2004/090294 and WO 2004/065088. Such filters make it possible to obtain chemically inert filter structures that have excellent thermal conductivity and that have porosity characteristics, in particular the average pore size and the pore size distribution, which are ideal for an application in filtering soot from an internal combustion engine.

However, certain drawbacks specific to this material still remain:

A first drawback is linked to the slightly raised thermal expansion coefficient of the SiC, greater than $3.10^{-6}$ $K^{-1}$, which does not allow large-sized monolithic filters to be manufactured and usually requires the filter to be divided into several honeycomb elements joined together by a cement, such as is described in application EP 1 455 923. A second drawback, of economic nature, is linked to the extremely high firing temperature, typically greater than 2100° C., enabling a sintering that provides a sufficient thermomechanical strength of the honeycomb structures, especially during successive filter regeneration phases. Such temperatures require the installation of special equipment which substantially increases the cost of the filter finally obtained.

On the other hand, although cordierite filters are known and have been used for a long time due to their low cost, it is now known that problems can arise in such structures, especially during poorly controlled regeneration cycles, during which the filter may be subjected locally to temperatures above the melting point of the cordierite. The consequences of these hot spots may range from a partial loss of efficiency of the filter to its total destruction in the most severe cases. Moreover, cordierite does not have sufficient chemical inertia with respect to the temperatures achieved during successive regeneration cycles and is therefore capable of reacting and of being corroded by the species originating from the residues of lubricant, fuel or other oils accumulated in the structure during the filtration phases, this phenomenon possibly also being the cause of the rapid deterioration of the properties of the structure.

For example, such drawbacks are described in patent application WO 2004/011124 which proposes, in order to remedy them, a filter based on aluminum titanate (60 to 90% by weight) reinforced by mullite (10 to 40% by weight), the durability of which is improved.

According to another embodiment, application EP 1 559 696 proposes the use of powders for the manufacture of honeycomb filters obtained by reactive sintering of oxides of aluminum, titanium and magnesium between 1000 and 1700° C. The material obtained after sintering is in the form of a two-phase mixture: a major phase of $Al_2TiO_5$ pseudo-brookite alumina titanate structural type containing titanium, aluminum and magnesium and a minor feldspar phase, of $Na_yK_{1-y}AlSi_3O_8$ type.

However, the experiments carried out by the Applicant have shown that it was difficult, at the current time, to guarantee the performances of a structure based on materials of alumina titanate type, in particular to achieve thermal stability, thermal expansion coefficient and corrosion resistance values suitable, for example, for making it directly usable in a high-temperature application of the particulate filter type.

In particular, in the particular application of filtration of particulates by a material of the oxide group, the corrosion resistance must be controlled, so as to avoid modifications of the porosity of the filter. More specifically, a high propensity to the corrosion of the material used as a constituent of the filter causes a reaction capable of closing up the porosity and considerably reducing the filtration capacity and, in the most severe cases, may be the cause of a leak by piercing of a filter wall.

The objective of the present invention is thus to provide novel grains comprising or composed of an oxide material of the aluminum titanate type, having properties as described previously and in particular TEC, stability and corrosion resistance properties which are substantially improved, especially so as to make the use thereof more advantageous in numerous fields of application for ceramic materials and in particular for the manufacture of a filter and/or catalyst structure, typically of honeycomb structure.

More specifically, the present invention relates to fused grains having the following chemical composition, in weight percentages on the basis of the oxides:
  less than 55% of $Al_2O_3$;
  more than 35% and less than 80% of $TiO_2$;
  more than 1% and less than 20% of MgO;
  more than 0.7% and less than 20% of $ZrO_2$; and
  less than 20% of $SiO_2$, said fused grains also corresponding to the following composition, in molar percentages, on the basis of the single oxides $Al_2O_3$, $TiO_2$, MgO, $ZrO_2$:

$90<2a+3m<110$
$100+a<3t<210-a$,
$a+t+m+zr=100$, in which:
a is the molar percentage of $Al_2O_3$;
t is the molar percentage of $TiO_2$;
m is the molar percentage of MgO; and
zr is the molar percentage of $ZrO_2$.

The expression "on the basis of the oxides" is understood within the present description to mean that the percentages (weight or molar percentages) are calculated on the basis of the oxides corresponding to the elements present in said grains.

Preferably, in the preceding formulation, $92 \le 2a+3m \le 108$ and very preferably $92 \le 2a+3m \le 105$.

Preferably, in the preceding formulation, $100+a \le 3t \le 205-a$ and very preferably $100+a \le 3t \le 200-a$.

Preferably, $Al_2O_3$ represents more than 15% of the chemical composition, the percentages being given by weight on the basis of the oxides. For example, in particular for an application of the porous structure type, $Al_2O_3$ may represent more than 25% and more preferably more than 35% of the chemical composition. Preferably, $Al_2O_3$ represents less than 54%, or even less than 52% of the chemical composition, the percentages being given by weight on the basis of the oxides.

Preferably, $TiO_2$ represents more than 35% and very preferably more than 40% of the chemical composition. Preferably $TiO_2$ represents less than 60% and very preferably less than 55%, of the chemical composition, the percentages being given by weight on the basis of the oxides.

Preferably, MgO represents more than 1.5% and very preferably more than 2% of the chemical composition. Preferably MgO represents less than 10% and very preferably less than 6% of the chemical composition, the percentages being given by weight and on the basis of the oxides.

Preferably, $ZrO_2$ represents more than 0.8% of the chemical composition, the percentages being given by weight and on the basis of the oxides. Preferably, $ZrO_2$ represents less than 12% and very preferably less than 6% of the chemical composition. Without departing from the scope of the invention, at least one portion, or even all, of the $ZrO_2$ may be replaced by at least one oxide chosen from the group formed by $Ce_2O_3$ or $HfO_2$, on the basis of a molar percentage replacement of the Zr element by the Ce element and/or the Hf element. This is especially the case when the source of Zr used comprises a substantial proportion of Hf, as is common in the majority of the zirconium sources sold to date. Relative to the weight percentage of all the oxides present, the grains according to the invention may also comprise other elements present in the minority. In particular, the grains may comprise silicon, in an amount, for example, between 0.01 and 20%, preferably between 0.1 and 10%, on an $SiO_2$ basis.

The grains may also comprise other elements such as Ca, Na, K, Fe, Ba, Sr, the total additive amount of said elements present being, for example, below 6 wt %, in particular below 3 wt %, or even below 2 wt % on the basis of the corresponding oxides, relative to the weight percentage of all of the oxides corresponding to the elements present in said grains. According to one embodiment, the percentage of each minority element, on the basis of the weight of the corresponding oxide, is preferably less than 0.7%. According to another embodiment, the percentage of the elements Ca, Sr, Ba, on the basis of the weight of the corresponding oxides, is greater than 2%, or even greater than 3%, in particular between 3 and 5 wt %.

In order not to needlessly increase the present description, all the possible combinations according to the invention between the various preferred modes of compositions of the grains according to the invention, such as have just been described above, are not reported. It is however clearly understood that all the possible combinations of the initial and/or preferred fields and values described previously are envisaged and should be considered as described by the Applicant in the context of the present description (in particular of two, three combinations or more).

The fused grains according to the invention may mainly comprise or be composed of an oxide phase of pseudo-brookite type comprising titanium, aluminum, magnesium and zirconium.

The term "mainly" is understood within the present description to mean that the phase of pseudo-brookite type represents at least 60% and preferably at least 70% or even at least 80% of the total weight of the grains.

The grains according to the invention may also comprise a minority phase composed of a silicate phase, in proportions which may range from 0 to 40% of the total weight of the grains, preferably from 0 to 30% and very preferably from 0 to 25% of the total weight of the grains. According to the invention, said silicate phase may be mainly composed of silica and alumina. Preferably, the proportion of silica in the silicate phase is greater than 50%, or even greater than 60%.

The grains according to the invention may also comprise a minority phase essentially comprising titanium oxide $TiO_2$ and/or zirconium oxide $ZrO_2$. The expression "essentially comprising" is understood to mean that the weight percentage of $TiO_2$ and/or of $ZrO_2$ in this phase is of the order of at least 80%, or even of at least 90%.

The oxide phase of pseudo-brookite type of the fused grains according to the present invention may substantially correspond to the formulation:

$$(Al_2TiO_5)_x(MgTi_2O_5)_y(MgTiZrO_5)_z,$$

in which:
x is between 0 and 0.945;
y is between 0.05 and 0.995;
z is between 0.005 and 0.1; and
$x+y+z=1$.

For example, the fused grains according to the invention comprise a main phase of pseudo-brookite type and at least one secondary phase, said secondary phase being a silicate phase and/or a phase composed essentially of titanium oxide $TiO_2$ and/or zirconium oxide $ZrO_2$.

The invention also relates to a ceramic product comprising grains as described previously, especially for use in the following fields: manufacture of refractory parts used in contact with aluminum or with molten metals, slide-gate valve plates, metal filters or manufacture of saggar products for sintering furnaces.

In particular, the invention relates, according to one possible embodiment, to a ceramic product that is characterized in that it comprises a ceramic material, itself mainly comprising or being composed of an oxide phase of pseudo-brookite type comprising titanium, aluminum, magnesium and zirconium, in proportions such that the pseudo-brookite type phase corresponds substantially to the formulation:

$$(Al_2TiO_5)_x(MgTi_2O_5)_y(MgTiZrO_5)_z,$$

said material corresponding to the following composition, in molar percentages, on the basis of the single oxides $Al_2O_3$, $TiO_2$, MgO, $ZrO_2$:

2a+3m<110
100+a<3t<210−a,
a+t+m+zr=100, in which:
   a is the molar percentage of $Al_2O_3$;
   t is the molar percentage of $TiO_2$;
   m is the molar percentage of MgO; and
   zr is the molar percentage of $ZrO_2$.

Preferably, in the preceding formulation, $92 \leq 2a+3m \leq 108$ and very preferably $95 \leq 2a+3m \leq 105$.

Preferably, in the preceding formulation, $100+a \leq 3t \leq 205-a$ and very preferably $100+a\ 3t \leq 200-a$.

Typically, the ceramic product according to the invention has the following chemical composition, in weight percentages on the basis of the oxides:
   less than 55% of $Al_2O_3$;
   more than 35% and less than 80% of $TiO_2$;
   more than 1% and less than 20% of MgO;
   more than 0.7% and less than 20% of $ZrO_2$; and
   less than 20% of $SiO_2$.

According to one possible embodiment, the ceramic product according to the invention has the following chemical composition, in weight percentages, on the basis of the oxides:
   more than 35% and less than 54% of $Al_2O_3$;
   more than 40% and less than 55% of $TiO_2$;
   more than 1.5% and less than 10% of MgO;
   more than 0.7% and less than 6% of $ZrO_2$; and
   less than 10% of $SiO_2$, preferably at least 0.1% of $SiO_2$ and in a manner at least 1%, or even at least 2% of $SiO_2$.

In the ceramic product according to the invention, the values of x, y and z of the preceding formulation are defined, for example, as follows:
   x is between 0 and 0.945;
   y is between 0.05 and 0.995;
   z is between 0.005 and 0.1; and
   x+y+z=1.

According to possible embodiments:
   x is between 0.70 and 0.90;
   y is between 0.05 and 0.50;
   z is between 0.007 and 0.07; and
   x+y+z=1.

The ceramic product according to the invention may, for example, comprise a main phase composed of the phase of pseudo-brookite type and at least one secondary phase, said secondary phase being a silicate phase and/or a phase composed essentially of titanium oxide $TiO_2$ and/or zirconium oxide $ZrO_2$.

Said secondary phase may especially be composed of a silicate phase, in proportions which may range from 0 to 40% of the total weight of the material. Typically, said silicate phase is mainly composed of silica and alumina, the weight proportion of silica in the silicate phase being greater than 50%.

Another secondary phase may essentially comprise titanium oxide $TiO_2$ and/or zirconium oxide $ZrO_2$.

According to one particular embodiment, the ceramic product according to the invention has a honeycomb type structure, in particular in the form of a catalyst support or filter for an automotive application, the ceramic material forming said structure having a porosity of greater than 10% and a pore size centered between 5 and 60 microns.

The grains of the invention may advantageously be produced by electrofusion, which allows the manufacture of large amounts of grains with advantageous yields and a very good price/performance ratio.

The invention also relates to the process for manufacturing grains described previously, comprising the following steps:
   a) mixing raw materials to form the starting feedstock;
   b) fusion of the starting feedstock until a molten liquid is obtained;
   c) cooling of said molten liquid so that the fused liquid is entirely solidified, for example in less than 3 minutes; and
   d) optionally, milling of said solid mass so as to obtain a mixture of grains.

According to the invention, the raw materials are chosen in step a) so that the grains obtained in step d) are in accordance with the invention.

Of course, without departing from the scope of the invention, any other conventional or known process for manufacturing fused grains may also be used, provided that the composition of the feedstock makes it possible to obtain grains having a composition according to that of the grains of the invention.

In step b), use is preferably made of an electric arc furnace, but any known furnaces can be envisaged, such as an induction furnace or a plasma furnace, provided that they make it possible to completely melt the feedstock. Firing is preferably carried out under inert conditions, for example under argon, or oxidizing conditions, preferably at atmospheric pressure.

In step c), the cooling may be rapid, that is to say the fused liquid is completely solidified in less than minutes. Preferably, it results from casting in CS molds as described in U.S. Pat. No. 3,993,119 or from quenching.

In step d), the solid mass is milled, according to conventional techniques, until the size of the grains suitable for the envisaged application is obtained.

According to one particular application, the present invention relates to a structure of honeycomb type, made from a porous ceramic material, said structure being composed of a porous ceramic material obtained from at least 5% by weight of grains according to the invention and preferably from at least 20%, 50%, 80% or even 100% by weight of grains according to the invention.

When the structures obtained according to the invention are intended for use as a catalyst support or particulate filter, they have a suitable porosity, in general between 20 and 65%, the average pore size ideally being between 10 and 20 microns.

Such filtering structures usually have a central part comprising a honeycomb filtering element or a plurality of honeycomb filtering elements joined together by a joint cement, said element or elements comprising a set of adjacent ducts or channels with axes parallel with one another separated by porous walls, which ducts are stopped by plugs at one or other of their ends to delimit inlet chambers opening on a gas intake face and outlet chambers opening on a gas discharge face, in such a way that the gas passes through the porous walls.

A process for manufacturing such a structure from an initial mixture of grains according to the invention is for example the following:

Firstly, fused grains according to the invention are mixed as described previously. For example, the fused grains were milled so that they have a median diameter of less than 50 microns. The manufacturing process typically comprises a step of mixing an initial mixture comprising the grains, an organic binder of methyl cellulose type and a pore-forming agent, then adding water until the plasticity desired for enabling the extrusion step that follows is obtained.

For example, during the first step, a mixture comprising the following is mixed:
- at least 5% by weight, for example at least 50%, or at least 90% or even 100% of grains according to the invention, the remainder of the mixture possibly being composed of powder or grains of other materials or else of single oxides of the elements Al, Ti, Mg or Zr or of precursors of said oxides, for example in the form of carbonates, hydroxides or other organometallic compounds of the preceding elements;
- optionally from 1 to 30% by weight of at least one pore-forming agent chosen as a function of the desired pore size;
- at least one organic plasticizer and/or an organic binder; and
- a suitable amount of water to enable the forming of the product.

The term "precursor" is understood to mean a material that decomposes to the corresponding single oxide at an often early stage of the heat treatment, that is to say at a firing temperature typically of less than 1000° C., or less than 800° C. or even 500° C.

The mixing results in a homogeneous product in the form of a paste. The step of extruding this product through a suitable die makes it possible to obtain monoliths in honeycomb form. The process further comprises, for example, a step of drying the monoliths obtained. During the drying step, the green ceramic monoliths obtained are typically dried by microwave or at a temperature for a sufficient time to bring the content of water not chemically bound to less than 1% by weight. In the case where it is desired to obtain a particulate filter, the process may also comprise a step of closing off one channel in two at each end of the monolith.

The step of firing the monoliths is carried out at a temperature above 1300° C. but that does not exceed 1800° C., preferably that does not exceed 1750° C. For example, during this firing step, the monolith structure is brought to a temperature between 1400° C. and 1600° C., under an atmosphere that contains oxygen or an inert gas.

The process may optionally comprise a step of assembling monoliths into a filtration structure assembled to well-known techniques, for example described in application EP 816 065.

The present invention relates, according to one application example, to a filter or a catalyst support obtained from a structure as described previously and by deposition, preferably by impregnation, of at least one supported or preferably unsupported active catalyst phase, typically comprising at least one precious metal such as Pt and/or Rh and/or Pd and optionally an oxide such as $CeO_2$, $ZrO_2$, $CeO_2$—$ZrO_2$. Such structures especially find their application as a catalyst support in an exhaust line of a diesel or petrol engine or as a catalytic particulate filter in an exhaust line of a diesel engine.

The invention and its advantages will be better understood on reading the following non-limiting examples. In the examples, all the percentages are given by weight.

EXAMPLES

In all the examples, the samples were prepared from the following raw materials:
- anatase comprising more than 98% of $TiO_2$, sold by Altichem, or rutile comprising more than 95% of $TiO_2$ and having a median diameter $d_{50}$ of around 120 μm, sold by Europe Minerals;
- alumina AR75 comprising more than 98% of $Al_2O_3$, sold by Alcan and having a median diameter $d_{50}$ of around 85 μm;
- $SiO_2$ with a degree of purity greater than 99.5% and of median diameter $d_{50}$: 208 μm, sold by Sifraco;
- MgO with a degree of purity greater than 98% with more than 80% of particles having a diameter between 0.25 and 1 mm, sold by Nedmag;
- lime comprising around 97% of CaO, with more than 80% of particles having a diameter of less than 80 μm;
- potassium carbonate containing more than 99.5% of $K_2CO_3$, sold by Albemarle with more than 80% of particles having a diameter between 0.25 and 1 mm; and
- zirconia with a degree of purity greater than 98.5% and of median diameter $d_{50}$=3.5 μm, sold under the reference CC10 by Saint-Gobain ZirPro.

The samples of the examples according to the invention and comparative examples were obtained by melting the mixture of the preceding powders, in the appropriate proportions.

More precisely, the initial mixtures of reactants were melted in an electric arc furnace, in air. The fused mixtures were then cast in a CS mold so as to obtain rapid cooling. They are then milled and screened in order to retain the powders exceeding 36 μm. These powders are used to produce pressed samples in the form of disks that are then sintered at a temperature between 1300° C. and 1600° C. for 4 hours. The samples or materials of Examples 1 to 14 are thus obtained.

The samples prepared are then analyzed. The results of the analyses carried out on each of the samples of the examples are collated in Tables 1 and 2.

In Tables 1 and 2:
1°) The chemical composition, indicated in weight percentages on the basis of the oxides, was determined by X-ray fluorescence.

2°) The crystalline phases present in the refractory products were characterized by X-ray diffraction and microprobe analysis. In Table 1, AMTZ indicates a solid solution of the $(Al_2TiO_5)_x(MgTi_2O_5)_y(MgTiZrO_5)_z$ type, P2 indicates the presence of a minority secondary phase and PS corresponds to a silicate secondary phase, "M" corresponds to the main phase, "~" means that the phase is present in trace amounts.

3°) The stability of the crystalline phases present is evaluated by a test that consists in comparing, by X-ray diffraction, the crystalline phases present initially to those present after a heat treatment of 100 hours at 1100° C. The product is considered to be stable if the maximum intensity of the main peak expressing the appearance of rutile $TiO_2$ after this treatment remains less than 50% of the average of the maximum intensities of the 3 main peaks of the AMTZ phase. The values listed in Table 1 correspond to the ratio, in percentages, between the maximum intensity of the main peak of the rutile phase relative to the average of the maximum intensities of the 3 main peaks of the AMTZ phase according to the equation:

$$TiO_2/AMTZ = \frac{\text{Max. intensity of the main peak of the rutile}}{\text{Average of the max. intensities of the 3 largest peaks of } AMTZ}$$

It is considered that a ratio below 50 of the intensities, as described previously, characterizes a good stability of the material and allows the use thereof.

4° The thermal expansion coefficient (TEC) corresponds to the average of the values conventionally obtained from 25° C.

to 1000° C. by dilatometry on pellets prepared from powders of the same particle size range, the median diameter $d_{50}$ of which is less than 50 μm. The pellets are obtained by pressing then sintering at the temperature indicated in Table 1.

5° The modulus of rupture (MoR) is determined at ambient temperature by 4-point bending in a conventional manner on bars having dimensions 45 mm×4 mm×3 mm obtained by isostatic pressing then sintering of the powders.

TABLE 1

| Example | | 1 | 2 | 3 | 4 | 5 | 6 | 7 | 8 |
|---|---|---|---|---|---|---|---|---|---|
| | $Al_2O_3$ | 37.1 | 41.7 | 37.5 | 0.42 | 37.1 | 36.5 | 40.5 | 40.5 |
| | $TiO_2$ | 51.3 | 43.6 | 48.6 | 65.3 | 47.3 | 51.2 | 48.5 | 48.5 |
| | MgO | 5.49 | 4.25 | 3.92 | 19.1 | 5.71 | 5.63 | 3.98 | 3.98 |
| | $SiO_2$ | 0.51 | 4.61 | 5.23 | 0.59 | 4.63 | 1.02 | 4.81 | 4.81 |
| | CaO | 0.06 | 0.25 | 0.21 | 0.15 | 0.22 | 0.11 | 0.17 | 0.17 |
| | BaO | — | — | — | — | — | — | — | — |
| | $Na_2O$ | 0.08 | 0.13 | 0.12 | 0.03 | 0.11 | 0.11 | 0.15 | 0.15 |
| | $K_2O$ | — | 0.38 | 0.57 | 0.01 | 0.38 | 0.08 | 0.47 | 0.47 |
| | $Fe_2O_3$ | 0.56 | 0.56 | 0.91 | 0.70 | 0.47 | 0.49 | 0.55 | 0.55 |
| | $ZrO_2$ | 4.9 | 4.55 | 2.97 | 13.7 | 4 | 4.86 | 0.85 | 0.85 |
| | a | 30.8 | 37.3 | 33.5 | 0.3 | 32.2 | 30.4 | 35.8 | 35.8 |
| | t | 54.3 | 49.8 | 55.4 | 58.1 | 52.4 | 54.4 | 54.7 | 54.7 |
| | m | 11.5 | 9.6 | 8.9 | 33.7 | 12.5 | 11.9 | 8.9 | 8.9 |
| | zr | 3.4 | 3.4 | 2.2 | 7.9 | 2.9 | 3.3 | 0.6 | 0.6 |
| | 2a + 3m | 96.1 | 103.4 | 93.6 | 101.6 | 102.0 | 96.3 | 98.2 | 98.2 |
| | 100 + a | 130.8 | 137.3 | 133.5 | 100.3 | 132.2 | 130.4 | 135.8 | 135.8 |
| | 3t | 163.0 | 149.3 | 166.3 | 174.4 | 157.2 | 163.2 | 164.1 | 164.1 |
| | 210 − a | 179.2 | 172.7 | 176.5 | 209.7 | 177.8 | 179.6 | 174.2 | 174.2 |
| Phase | AMTZ | M | M | M | M | M | M | M | M |
| | P2 | — | — | — | — | — | — | — | — |
| | Other phase | no | no | no | no | no | no | no | no |
| | PS | no | yes | yes | yes | yes | yes | yes | yes |
| Stability | 100 hours | yes | yes | yes | | yes | yes | yes | yes |
| | $TiO_2$/AMTZ peak ratio | <10 | <20 | <30 | | <20 | <5 | <10 | <10 |
| | 4 h sintering temp. (° C.) | 1600 | 1450 | 1450 | 1500 | 1450 | 1450 | 1300 | 1450 |
| | TEC ($10^{-6}$/° C.) | 0.8 | 1.1 | | 7.5 | 1.5 | 2.8 | 0.06 | 1.5 |
| | MOR (MPa) | | 13.2 | 15.1 | | 12.6 | | 21.4 | 14.8 |

| Example | | 9 | 10 | 11 | 12 | 13 | 14 |
|---|---|---|---|---|---|---|---|
| | $Al_2O_3$ | 39.4 | 39.1 | 38.6 | 46.1 | 40.5 | 40.5 |
| | $TiO_2$ | 47.4 | 45.4 | 42.5 | 48.0 | 43.9 | 41.4 |
| | MgO | 4.33 | 4.46 | 4.45 | 2.52 | 3.01 | 2.06 |
| | $SiO_2$ | 5.88 | 8.0 | 10.8 | 0.88 | 3.93 | 7.83 |
| | CaO | 0.09 | 0.12 | 0.20 | 0.06 | 0.31 | 3.33 |
| | BaO | — | — | — | — | 3.39 | — |
| | $Na_2O$ | 0.13 | 0.12 | 0.10 | 0.06 | 0.09 | — |
| | $K_2O$ | 0.01 | 0.01 | 0.01 | — | — | — |
| | $Fe_2O_3$ | 0.51 | 0.51 | 0.41 | 0.41 | 0.46 | — |
| | $ZrO_2$ | 2.25 | 2.28 | 2.03 | 1.94 | 4.46 | 4.87 |
| | a | 35.0 | 35.5 | 36.5 | 40.0 | 37.6 | 39.5 |
| | t | 53.7 | 52.6 | 51.3 | 53.1 | 52.4 | 51.5 |
| | m | 9.7 | 10.2 | 10.6 | 5.5 | 7.1 | 5.1 |
| | zr | 1.7 | 1.7 | 1.6 | 1.4 | 3.5 | 3.9 |
| | 2a + 3m | 99.1 | 101.7 | 104.9 | 96.5 | 96.5 | 94.3 |
| | 100 + a | 135.0 | 135.5 | 136.5 | 140.0 | 137.5 | 139.5 |
| | 3t | 161.0 | 157.7 | 153.9 | 159.4 | 157.2 | 154.4 |
| | 210 − a | 175.0 | 174.5 | 173.5 | 170.0 | 172.4 | 170.4 |
| Phase | AMTZ | M | M | M | M | M | M |
| | P2 | — | — | — | — | — | — |
| | Other phase | no | no | no | no | no | no |
| | PS | yes | yes | yes | no | yes | yes |
| Stability | 100 hours | | | | yes | yes | yes |
| | $TiO_2$/AMTZ peak ratio | | | | <20 | <20 | <20 |
| | 4 h sintering temp. (° C.) | 1450 | 1450 | 1450 | 1450 | 1450 | 1400 |
| | TEC ($10^{-6}$/° C.) | 1.81 | 1.86 | 1.97 | 1.6 | 3.2 | 2.8 |
| | MOR (MPa) | 14.8 | 16.6 | 20.9 | | | |

It is observed from the data from Table 1 that the grains according to the invention make it possible to obtain, in the end, ceramic products that are characterized by a stability and a TEC that are compatible with numerous ceramic applications, in particular a particulate filter application. They also have good mechanical strength.

The composition of each phase was then analyzed by microprobe analysis, the results of the analysis being given in Table 2. On the basis of these results, the weight percentage of each phase and also the values of x, y and z in the general formula $(Al_2TiO_5)_x(MgTi_2O_5)_y(MgTiZrO_5)_z$ of the main AMTZ phase were able to be estimated by calculation.

Comparative samples, not in accordance with the invention, were also synthesized and analyzed according to the same methods as described previously, with however the following modifications:

According to a first Comparative Example 1, the fused grains were synthesized without introducing a source of zirconium into the initial reactants.

According to a second Comparative Example 2, the samples were not synthesized with fused grains but from grains obtained by reactive sintering of powders of the raw materials described previously.

TABLE 2

| | Example | | | | | | | | | | | |
|---|---|---|---|---|---|---|---|---|---|---|---|---|
| | 2 | | | 8 | | | 10 | | | 11 | | |
| | AMTZ | PS | P2 | AMTZ | PS | P2 | AMTZ | PS | P2 | AMTZ | PS | P2 |
| $Al_2O_3$ | 45.9 | 26 | 0.4 | 45 | 21 | 1.4 | 49.4 | 20.7 | 8.1 | 49.5 | 20.8 | 0.9 |
| $TiO_2$ | 47.6 | 2.8 | 10 | 50.1 | 4.9 | 91.7 | 47.5 | 3.6 | 42 | 47 | 4.8 | 89.7 |
| MgO | 3.52 | 10.2 | 0.07 | 3.9 | 4.2 | 0.1 | 2.1 | 11.6 | 1.4 | 2.3 | 11.4 | 0.1 |
| $SiO_2$ | 0.22 | 51.3 | 0.13 | 0.2 | 60.4 | 0.6 | 0.3 | 60.2 | 1.4 | 0.5 | 59.4 | 0.4 |
| $ZrO_2$ | 2.17 | 1.57 | 89.2 | 0.4 | 1.4 | 6 | 0.4 | 2.4 | 46.8 | 0.4 | 2.8 | 8.5 |
| CaO | | 2.47 | | | 2.2 | 0.1 | | 0.6 | | | 0.3 | |
| $Na_2O$ | | 1.05 | | | 0.9 | | | 1.1 | 0.1 | | 0.5 | |
| $K_2O$ | | 4.32 | | | 5.2 | 0.1 | | 0.1 | | | | |
| $Fe_2O_3$ | 0.53 | 0.14 | | 0.5 | | 0.2 | 0.2 | 0.1 | 0.1 | 0.2 | 0.2 | 0.2 |
| estimated x (×100) | 84 | — | — | 82 | — | — | 89.5 | — | — | 89.8 | — | — |
| estimated y (×100) | 12 | — | — | 17 | — | — | 9.8 | — | — | 9.2 | — | — |
| estimated z (×100) | 4 | — | — | 1 | — | — | 0.7 | — | — | 1.1 | — | — |
| estimated percentage | 89 | 8 | 3 | 86 | 9 | 5 | 73 | 14 | 13 | 71 | 19 | 10 |

| | Example | | | | | | | | |
|---|---|---|---|---|---|---|---|---|---|
| | 5 | | | 1 | | 9 | | | |
| | AMTZ | PS | P2 | AMTZ | P2 | AMTZ | PS | P2 | |
| $Al_2O_3$ | 43.1 | 23.8 | 0.8 | 39.5 | 0.9 | 48 | 20.9 | 0.9 | |
| $TiO_2$ | 49.9 | 3.1 | 36.8 | 51.4 | 38.4 | 47.7 | 3.2 | 87.9 | |
| MgO | 4.5 | 8.1 | 0.1 | 5.9 | 0.1 | 2.8 | 11.4 | 0.1 | |
| $SiO_2$ | 0.2 | 55.1 | | | 0.8 | 0.3 | 60.7 | 0.1 | |
| $ZrO_2$ | 1.7 | 1.3 | 62.2 | 2.6 | 59.9 | 0.7 | 2.2 | 10.9 | |
| CaO | | 2.8 | | | | | 0.7 | | |
| $Na_2O$ | | 1.3 | | | | | 0.9 | | |
| $K_2O$ | | 4.8 | | | | | 0.1 | | |
| $Fe_2O_3$ | 0.5 | 0.1 | 0.1 | 0.7 | 0.1 | 0.4 | 0.1 | 0.2 | |
| estimated x (×100) | 79.4 | — | — | 73.3 | — | 87.4 | — | — | |
| estimated y (×100) | 17.6 | — | — | 22.2 | — | 11.1 | — | — | |
| estimated z (×100) | 3 | — | — | 4.5 | — | 1.5 | — | — | |
| estimated percentage | 87 | 7 | 6 | 94 | 6 | 78 | 10 | 12 | |

According to a third Comparative Example 3, the fused grains were synthesized using too low an amount of titanium in the initial mixture, so that 3t<100+a and 2a+3m>110.

According to a fourth Comparative Example 4, the fused grains were synthesized by using an amount of $Al_2O_3$ and of $TiO_2$ such that 3t<100+a.

The compositions and the results obtained for these three comparative examples are collated in Table 3.

TABLE 3

|       |                | Comparative example 1 | Comparative example 2 | Comparative example 3 | Comparative example 4 |
|-------|----------------|-----------------------|-----------------------|-----------------------|-----------------------|
|       | $Al_2O_3$      | 40.0                  | 40.0                  | 53.1                  | 53.7                  |
|       | $TiO_2$        | 49.1                  | 49.1                  | 39.4                  | 42.8                  |
|       | MgO            | 4.17                  | 4.17                  | 2.89                  | 2.06                  |
|       | $SiO_2$        | 5.08                  | 5.08                  | 0.98                  | 0.33                  |
|       | CaO            | 0.22                  | 0.22                  | 0.05                  | 0                     |
|       | $Na_2O$        | 0.12                  | 0.12                  | 0.09                  | 0.09                  |
|       | $K_2O$         | 0.64                  | 0.64                  | 0                     | <0.01                 |
|       | $Fe_2O_3$      | 0.64                  | 0.64                  | 0.44                  | 0.41                  |
|       | $ZrO_2$        | 0.03                  | 0.03                  | 2.95                  | 0.56                  |
|       | a              | 35.3                  | 35.3                  | 46.9                  | 47.1                  |
|       | t              | 55.3                  | 55.3                  | 44.5                  | 47.9                  |
|       | m              | 9.3                   | 9.3                   | 6.5                   | 4.6                   |
|       | zr             | 0.0                   | 0.0                   | 2.2                   | 0.6                   |
|       | 2a + 3m        | 98.6                  | 98.6                  | 113.2                 | 108                   |
|       | 100 + a        | 135.3                 | 135.3                 | 146.9                 | 147.1                 |
|       | 3t             | 166.0                 | 166.0                 | 133.4                 | 143.7                 |
|       | 210 − a        | 174.7                 | 174.7                 | 163.1                 | 162.9                 |
| Phase | AMTZ           | M                     | M                     | M                     |                       |
|       | P2             | ~                     | ~                     | ~                     |                       |
|       | Other phase    | no                    | no                    | no                    |                       |
|       | PS             | yes                   | yes                   | no                    |                       |
| Stability | 100 hours  | yes                   | yes                   | no                    | no                    |
|       | $TiO_2$/AMTZ peak ratio | <10          | <10                   | >200                  | >100                  |
|       | 4 h sintering temp. (° C.) | 1450      | 1450                  | 1450                  | 1600                  |
|       | TEC ($10^{-6}$/° C.) | 4.1              | 3.9                   | 1.6                   |                       |
|       | MOR (MPa)      | 12.2                  |                       |                       |                       |

From the data reported in Table 3 it is seen that the materials obtained with grains not in accordance with the invention have properties substantially lower than the preceding examples according to the invention.

In particular, Comparative Examples 3 and 4, not in accordance with the invention, have a manifestly insufficient stability.

Moreover, the corrosion resistance properties of the materials were evaluated for Example 8 (according to the invention) and Comparative Example 2. More specifically, 0.2 g of $K_2SO_4$ powder are deposited uniformly over the surface of the disk. The thus recovered sample is then brought to 1300° C. in air for 5 hours. After cooling, the sample is cut along a radial section and prepared for cross-sectional observation using a scanning electron microscope. The depth E of the sample, from the initial surface of the disk, affected by corrosion is then evaluated visually on the SEM photographs. The depth E affected by erosion is 60 microns for the sample according to the invention (Example 8) and 150 microns for the comparative example (Comparative Example 2).

The same corrosion resistance test, apart from the fact that $K_2SO_4$ is replaced by $Na_2CO_3$, carried out on a sample in accordance with the preceding Example 2 according to the invention, shows that this sample is not eroded at the end of 5 hours (E=0). The same test, carried out on a sample of the same composition but which is obtained directly by reactive sintering of the initial reactants (without going through an intermediate melting step in order to obtain fused grains), leads, on the other hand, to an erosion value E=160 microns.

Application Example

Properties of the Material for a Specific Use as a Particulate Filter

In order to study the characteristics of parts formed from the material obtained according to the invention, especially for an application as particulate filters, porous samples were prepared according to the invention from the same powders used previously in order to produce samples 2 and 5, the chemical analysis of which is listed in Table 4.

The performances of the samples obtained according to Examples 2 and 5 were compared to a sample not conforming to the invention (new Comparative Example 5). The porous material is synthesized, according to this Comparative Example 5, from grains obtained by reactive sintering of the powders of raw materials, without introducing a source of zirconium into the initial reactants.

All the initial powders (fused grains and raw materials) have a median diameter of less than 100 μm. Within the meaning of the present description, the median diameter denotes the diameter of the particles below which 50% by volume of the population is located.

As described previously in the description, a porous ceramic material is obtained in the following manner: the powders are mixed with 5%, relative to the total weight of the mixture of powders, with an organic binder of methyl cellulose type and 8% of a pore-forming agent. Water is added while mixing until a homogeneous paste is obtained, the plasticity of which enables the extrusion of a sample in the shape of a bar having the size of 6 mm×8 mm×60 mm, which is then sintered at 1450° C. or 1400° C. for 4 hours, as indicated in Table 4.

In order to estimate the value of the material used in a "particulate filter" application, the following parameters were measured for these samples: the thermal expansion coefficient, the modulus of rupture MoR and also the porosity characteristics. Conventionally, these characteristics are measured by the well-known techniques of high-pressure mercury porosimetry, using a Micromeritics 9500 porosimeter.

The sintering shrinkage expresses the dimensional change of the sample after sintering at 1450° C. or 1400° C. depending on the examples. More specifically, according to the invention the expression "sintering shrinkage" is understood to mean the average reduction along each of the two dimensions of the cross section of the material, that remains at low temperature, that is to say at a temperature below 400° C. and especially at ambient temperature. In Table 4, the value reported for the shrinkage corresponds to the average shrinkage for the two dimensions, expressed as a percentage of the initial dimension of the bar before sintering, for each of said dimensions. This characteristic is extremely important for estimating the feasibility of the process for manufacturing the porous structure. This is because a high sintering shrinkage means that the honeycomb made up of the material presents major difficulties for industrialization, especially for obtaining, with acceptable reproducibility, structures whose dimensional characteristics can be guaranteed with sufficient precision to enable the use thereof, without difficulties, in an automotive exhaust line.

The modulus of rupture (MOR) is determined at ambient temperature by 3-point bending on the porous bars having dimensions of 60 mm×6 mm×8 mm obtained previously.

The results are presented in Table 4.

TABLE 4

| | Example | | | | |
|---|---|---|---|---|---|
| | 2 (inv.) | | 5 (inv.) | | comp5 |
| $Al_2O_3$ | 41.7 | | 37.1 | | 44.9 |
| $TiO_2$ | 43.6 | | 47.3 | | 44.7 |
| MgO | 4.25 | | 5.71 | | 3.55 |
| $SiO_2$ | 4.61 | | 4.63 | | 6.49 |
| CaO | 0.25 | | 0.22 | | 0.03 |
| $Na_2O$ | 0.13 | | 0.11 | | 0.15 |
| $K_2O$ | 0.38 | | 0.38 | | 0.08 |
| $Fe_2O_3$ | 0.56 | | 0.47 | | 0.05 |
| $ZrO_2$ | 4.55 | | 4 | | <0.1 |
| 4 h sintering temp. (° C.) | 1400° C. | 1450° C. | 1400° C. | 1450° C. | 1450° C. |
| MOR (MPa) | 7.6 | 7.4 | 5.8 | 7.2 | 7.3 |
| Porosity (%) | 42.6 | 35.9 | 42.1 | 36.3 | 30.3 |
| $d_{50}$ pores (microns) | 12.4 | 16.4 | 12.2 | 16.8 | 8.6 |
| Sintering shrinkage (%) | 12 | 13.9 | 11.5 | 12.8 | 14.8 |

TABLE 4-continued

| | Example | | | | |
|---|---|---|---|---|---|
| | 2 (inv.) | | 5 (inv.) | | comp5 |
| TEC ($10^{-6}$/° C.) | 0.87 | | 0.27 | 1.24 | 0.44 | 0.79 |

The results given in Table 4 show that the grains of the invention make it possible to obtain materials and products whose overall characteristics are substantially better than those of conventionally obtained products.

In particular, in comparison with the data from Table 1, the significant improvement of the combined characteristics of porosity and mechanical strength which results from the use of fused grains according to the invention as initial products during the synthesis of the monoliths can be seen: for an identical sintering temperature, it is seen that the MoR strength of the porous bars according to Examples 2 and 5 according to the invention is comparable to those of the Comparative Example 5, whilst the constituent material of the bars according to these two examples has a porosity that is more than 20% higher and a pore diameter that is more than 75% larger than those of the conventional material according to Comparative Example 5.

In the preceding examples and description, the invention has especially been described in relation to the advantages that it provides with regard to a use in the field of particulate filters.

However, it is obvious that the invention also relates to the use of the grains of the invention in other applications, in particular all those where a good thermal stability and also a good TEC are necessary. Depending on the application, the size of the fused grains according to the invention could especially be adapted, in particular by choosing a suitable milling method.

The invention claimed is:

1. A fused grain comprising, in weight percentages, more than 15% and less than 55% of $Al_2O_3$; more than 35% and less than 80% of $TiO_2$; more than 2% and less than 20% of MgO; more than 0.7% and less than 20% of $ZrO_2$; and less than 20% of $SiO_2$, said fused grain also corresponding to the following composition, in molar percentages, on the basis of the single oxides $Al_2O_3$, $TiO_2$, MgO, $ZrO_2$:

90<2a+3m<110
100+a<3t<210−a,
a+t+m+zr=100, in which:
a is the molar percentage of $Al_2O_3$;
t is the molar percentage of $TiO_2$;
m is the molar percentage of MgO; and
zr is the molar percentage of $ZrO_2$,
wherein said fused grain comprises a main pseudo-brookite phase and at least one secondary phase, said secondary phase being (1) a silicate phase; and/or (2) a phase consisting essentially of titanium oxide $TiO_2$ and/or zirconium oxide $ZrO_2$.

2. The fused grain as claimed in claim 1, having the following chemical composition, in weight percentages, on the basis of the oxides:
more than 35% and less than 54% of $Al_2O_3$;
more than 40% and less than 55% of $TiO_2$;
more than 2% and less than 10% of MgO;
more than 0.7% and less than 6% of $ZrO_2$; and
more than 0.1% and less than 10% of $SiO_2$.

3. The fused grain as claimed in claim 1, wherein said pseudo-brookite phase comprises titanium, aluminum, magnesium and zirconium.

4. The fused grain as claimed in claim 3, wherein said pseudo-brookite phase substantially corresponds to the formulation:

$$(Al_2TiO_5)_x(MgTi_2O_5)_y(MgTiZrO_5)_z,$$

in which:
x is between 0 and 0.945;
y is between 0.05 and 0.995;
z is between 0.005 and 0.1; and
x+y+z=1.

5. The fused grain as claimed in claim 1, in which at least one portion of the $ZrO_2$ is replaced by at least one oxide selected from the group consisting of $Ce_2O_3$ and $HfO_2$, on the basis of a molar percentage replacement of the Zr element by the Ce element and/or the Hf element.

6. A process for manufacturing a fused grain as claimed in claim 1, comprising:
   a) mixing raw materials to form a starting feedstock;
   b) fusing the starting feedstock until a molten liquid is obtained;
   c) cooling the molten liquid so that the fused liquid is entirely solidified to obtain a solid mass; and
   d) milling the solid mass to obtain a mixture of grains.

7. A ceramic product comprising the fused grain as claimed in claim 1.

8. A ceramic product comprising a ceramic material obtained by a process comprising firing the fused grain as claimed in claim 1, at a temperature between 1300° C. and 1800° C., wherein said pseudo-brookite phase comprises titanium, aluminum, magnesium and zirconium, in proportions such that the pseudo-brookite phase corresponds substantially to the formulation:

$$(Al_2TiO_5)_x(MgTi_2O_5)_y(MgTiZrO_5)_z,$$

said material corresponding to the following composition, in molar percentages, on the basis of the single oxides $Al_2O_3$, $TiO_2$, MgO, $ZrO_2$:
90<2a+3m<110
100+a<3t<210−a,
a+t+m+zr=100,
in which:
a is the molar percentage of $Al_2O_3$;
t is the molar percentage of $TiO_2$;
m is the molar percentage of MgO; and
zr is the molar percentage of $ZrO_2$.

9. The ceramic product as claimed in claim 8, having the following chemical composition, in weight percentages on the basis of the oxides:
more than 15% and less than 55% of $Al_2O_3$;
more than 35% and less than 80% of $TiO_2$;
more than 2% and less than 20% of MgO;
more than 0.7% and less than 20% of $ZrO_2$; and
less than 20% of $SiO_2$.

10. The ceramic product as claimed in claim 9, having the following chemical composition, in weight percentages, on the basis of the oxides:
more than 35% and less than 54% of $Al_2O_3$;
more than 40% and less than 55% of $TiO_2$;
more than 2% and less than 10% of MgO;
more than 0.7% and less than 6% of $ZrO_2$; and
more than 0.1% and less than 10% of $SiO_2$.

11. The ceramic product as claimed in claim 8, in which:
x is between 0 and 0.945;
y is between 0.05 and 0.995;
z is between 0.005 and 0.1; and
x+y+z=1.

12. The ceramic product as claimed in claim 11, in which:
x is between 0.70 and 0.90;
y is between 0.05 and 0.50;
z is between 0.007 and 0.07; and
x+y+z=1.

13. The ceramic product as claimed in claim 12, in which a secondary phase comprises a silicate phase, in proportions which may range from 0 to 40% of the total weight of the material.

14. The ceramic product as claimed in claim 13, in which said silicate phase mainly comprises silica and alumina, the weight proportion of silica in the silicate phase being greater than 50%.

15. The ceramic product as claimed in claim 8, in which a secondary phase consists essentially of titanium oxide $TiO_2$ and/or zirconium oxide $ZrO_2$.

16. The ceramic product as claimed in claim 8, having a honeycomb structure, the ceramic material forming said structure having a porosity of greater than 10% and a pore size centered between 5 and 60 microns.

17. A catalyst support or filter for an automotive application comprising the ceramic product of claim 16.

* * * * *